US009942168B2

United States Patent
Liu et al.

(10) Patent No.: US 9,942,168 B2
(45) Date of Patent: *Apr. 10, 2018

(54) METHOD AND APPARATUS FOR IMPLEMENTING TRAFFIC FLAGS FOR LARGE SERVICE GROUPS

(71) Applicant: Entropic Communications, LLC, Carlsbad, CA (US)

(72) Inventors: Changwen Liu, San Diego, CA (US); David Barr, San Jose, CA (US); Michail Tsatsanis, Huntington Beach, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,422

(22) Filed: Feb. 14, 2017

(65) Prior Publication Data
US 2017/0171109 A1   Jun. 15, 2017

Related U.S. Application Data

(63) Continuation of application No. 14/386,460, filed as application No. PCT/US2013/033319 on Mar. 21, 2012.

(60) Provisional application No. 61/613,964, filed on Mar. 21, 2012.

(51) Int. Cl.
*H04L 12/911*  (2013.01)
*H04L 12/833*  (2013.01)
*H04L 12/891*  (2013.01)

(52) U.S. Cl.
CPC ............ *H04L 47/828* (2013.01); *H04L 47/31* (2013.01); *H04L 47/41* (2013.01)

(58) Field of Classification Search
None
See application file for complete search history.

(56) References Cited

U.S. PATENT DOCUMENTS

| | | | | |
|---|---|---|---|---|
| 2010/0082791 A1* | 4/2010 | Liu | ........................ | H04L 12/56 709/223 |
| 2010/0098257 A1* | 4/2010 | Mueller | ................ | H04L 5/0007 380/287 |
| 2010/0128740 A1* | 5/2010 | Beser | .................. | H04L 12/2801 370/468 |
| 2010/0214916 A1* | 8/2010 | Wu | ..................... | H04L 12/2801 370/230 |
| 2010/0246586 A1* | 9/2010 | Ohana | .................. | H04L 1/1874 370/400 |
| 2013/0128825 A1* | 5/2013 | Gallagher | ............. | H04W 28/26 370/329 |

* cited by examiner

*Primary Examiner* — Eunsook Choi
(74) *Attorney, Agent, or Firm* — McAndrews, Held & Malloy, Ltd.

(57) ABSTRACT

The use of traffic flag symbols allows a large number of CPEs to transmit traffic notifications to a network controller. In some such embodiments, hundreds of CPEs simultaneously transmit traffic flags on different subcarriers of a channel. For example, in a MoCA2 based access network, up to 480 CPEs can transmit flags in only 5 µs in the 100 MHz-wide channel.

54 Claims, 6 Drawing Sheets

METHOD AND APPARATUS FOR IMPLEMENTING TRAFFIC FLAGS FOR LARGE SERVICE GROUPS

CROSS-REFERENCE TO RELATED APPLICATIONS/INCORPORATION BY REFERENCE

This application is a continuation of 371 patent application No. PCT/US2013/033319, filed Mar. 21, 2012, and claims the benefit of provisional patent application No. 61/613,964, filed Mar. 21, 2012, both of which are hereby incorporated by reference in their entirety. The above-referenced United States patent application is hereby incorporated herein by reference in its entirety.

TECHNICAL FIELD

The present disclosure relates generally to communication networks, in which some embodiments of the disclosed method and apparatus relate to scheduling of traffic in a communications network.

BACKGROUND

An increasing use of communications networks is for content delivery to customer premises by service providers. For example, service providers may operate hybrid fiber/coax plants with network controllers at managed locations, such as a headend or fiber node. Access Networks based on the MoCA (Multimedia over Coax Alliance) 2.0 protocol are one type of network used for such content delivery system. FIG. 1 illustrates a network topology for an access network. In this network, a network controller 101 is in communication with a plurality of network nodes 103. For example, the network controller 101 may be an Access Network Controller (NC) (sometimes referred to as a Network Coordinator) managed by an Operator/Service Provider (OSP) or Multiple System Operator (MSO), such as a cable company. The network nodes 103 may comprise various Customer Premise Equipment (CPEs), such as televisions, computers, high-speed data modems, set-top boxes, or other network connected content delivery systems. The Access Network is arranged in a point-to-multipoint topology 102. In the point-to-multipoint topology, the network nodes 103 communicate with the NC 101 and the NC 101 communicates with each node 103, but the nodes 103 do not communicate with each other. In Access Networks, hundreds of CPEs can be in communication with a single NC. Other implementations of the MoCA standard involve in-home networks (HNs). MoCA HNs use mesh topologies with multipoint-to-multipoint topologies, where any node can communicate with any other node. MoCA HNs are usually 16 nodes or fewer, including the NC.

In an access network, downstream traffic is transmitted from the NC 101 to one, some, or all of the CPEs. Upstream traffic is transmitted from CPEs to the NC. Upstream traffic is generally transmitted one CPE at a time (sometimes called upstream bursts). When the NC 101 has information (sometimes referred to as "datagrams") to send to CPEs, it can simply schedule and transmit such downstream traffic. Accordingly, little or no preparation and interaction is required between NC 101 and the destination nodes 103 (or CPEs). However, upstream bursts require more preparation and interaction between the nodes 103 and the NC 101 in order for the NC 101 to properly schedule traffic. Datagrams that originate at the CPE are destined for the NC 101 (e.g., for processing by the NC 101, or for relay onto the internet, . . . ). When a CPE has data to send, the CPE must inform the NC 101 and wait for an upstream transfer to be scheduled.

In MoCA networks, access to the medium is controlled by the NC 101. The NC 101 divides the transmission time into units referred to as Media Access Plan (MAP) cycles. The NC 101 schedules transmission during the MAP cycles. FIG. 2 illustrates such MAP cycles 203, 205. Each MAP cycle 203, 205 is divided into time slots. During each MAP cycle 203, 205, the NC transmits a MAP packet 201, 202 that provides a schedule to all the network nodes indicating when, within the next MAP cycle, each packet (including the next MAP packet 202) will be sent. Networks may apply other scheduling methods as well. For example, the NC 101 may send individual (e.g., unicast) grants to each node or CPE 103.

FIG. 2 is a timing diagram that illustrates the timing relationship between MAPs 201, 202 and MAP cycles 203, 205. MAP 201 indicates the allocation of time slots within MAP cycle 205. Accordingly, each MAP 201 schedules all of the communication activity for the next MAP cycle 205 (including any communication that originates with the NC). Only one such "next MAP cycle" 205 is shown in FIG. 2, however, it should be understood that MAP 202 schedules all communications for the MAP cycle (not shown) that follows MAP cycle 205.

Reservation requests (RR) 207, 209, 211 are one particular type of packet that the MAP 201, 202 is responsible for scheduling. Six such RRs 207, 209 are shown in the first MAP cycle 203 of FIG. 2, starting with the first RR 207 and ending with the last RR 209. One RR 211 is shown in the second MAP cycle 205. Each RR 207, 209 is sent from one node 103. Each RR 207, 209 may contain one or more Reservation Request Elements (RREs). Each RRE communicates a desire on the part of the node 103 from which the RR 207, 209 was sent to transmit one MoCA packet. The RR 207, 209 allows a client node 103 to communicate to the NC 101 that the client node 103 has data packets it wishes to send. Furthermore, the RR 207, 209 indicates the packet length (from which the packet duration can be determined), packet priority, Flow ID and so on for those data packets. The NC 101 uses this information to schedule "transmission slots" during which the client node 103 can transmit those data packets it wishes to send. The NC 101 then communicates that schedule by generating and transmitting the MAP 201. The MAP 201 includes transmission slot assignments for the next MAP cycle 205.

During a "data packet transmission phase", an RR 207, 209 is either "granted" (i.e., scheduled) or discarded by the NC. The RR is granted depending on whether there is sufficient network bandwidth to service the request. It should be noted that for the purpose of this description, "granted" means that the NC 103 assigns a transmission slot to the packet associated with the RR 207 to allow the node that generated the request to transmit the associated packet during the assigned transmission slot in the next MAP cycle 205. The NC then transmits a MAP 201 to indicate the schedule to all of the nodes 103 of the network, including the requesting node. Each requesting node 103 then transmits the packets in MAC cycle 205 according to the schedule indicated by the MAP 201.

Network nodes 103, for example, customer premise equipment (CPEs), must inform the network controller 101 (or other such scheduler) when they have traffic to send upstream. For example, a notification may be needed when a new service flow starts up. A notification may also be required during existing flows if they have sparse or asynchronous transmissions. Currently, these notifications are transmitted in small packets, such as EPON Report messages, or MoCA Reservation Requests sent to the scheduler. Accordingly, large service groups that comprise several CPEs can generate a large number of small packets that are latency-sensitive (i.e., that can be adversely affected by a long latency).

The overhead required to transmit information (e.g., preambles, etc.) can limit the performance of a network when several small packets are transmitted. Ordinarily, small packets can be aggregated to create larger transmissions. Aggregation can mitigate the effects of the overhead that would otherwise be required to send the smaller packets. However, it is not desirable to aggregate small traffic notification packets because of the latency that occurs when aggregating packets. In some cases, if a CPE has already established an upstream flow, the traffic notification packets can be piggybacked on that flow. Otherwise, these requests need to be transmitted individually from each CPE.

Additionally, each upstream burst transmission includes a preamble before the payload. The preamble is generally included to allow the receiving node to synchronize itself to the transmission before the payload arrives. The preamble is substantial in length (e.g., 5~15 µs, or 1~3 symbol periods in duration). The preamble represents overhead because there is no user data being transferred during that period. This overhead is substantial, and is an even larger percentage for small payloads. Small packets (e.g., 64~100 byte payloads) make up the bulk of upstream traffic in access networks. For example, RRs 207, 209 are small packets. Every node or CPE 103 must regularly (e.g., every 1~2 milliseconds) transmit an RR 207, 209 to the NC 101. RRs 207, 209 must be scheduled and sent even when there is no data at the node or CPE awaiting scheduling (the NC does not know if there is data waiting or not, so it must schedule an RR to find out). This periodic transmission of RRs to discover if traffic needs to be scheduled is sometimes called "polling." The polling of all the nodes is sometimes called an "allocation cycle".

When there are a large number of nodes or CPEs in the network, then there are a large number of RRs that need to be sent to the NC. Not all nodes or CPEs are actively being used at any given time. For example, in access networks, it is possible that only 10% of subscribers are home and have their equipment in use at a given time. Nevertheless, these inactive CPEs are often polled in the allocation cycle because they may become active at any time and regular polling is the way the NC can know when a CPE has data to transmit. Other packets that are also both small and latency sensitive include TCP ACK acknowledgements, Voice-over-IP (VoIP) packets, interactive gaming messages, and the like.

The transmission of large numbers of small packets that cannot be aggregated can cause congestion and slow the pace of polling of all the CPEs. MoCA's MAP Cycle is similar to an allocation cycle (it is desirable for the NC to grant an RR to each node or CPE in each MAP Cycle). However, with a large number of nodes or CPEs it becomes difficult or unaffordable to fit RRs for every node or CPE (and their overhead) into the MAP cycle. Consequently, the NC may decide that some nodes or CPEs cannot be granted an RR every MAP Cycle. When the polling interval or allocation cycle gets long (e.g., due to inefficiencies and/or large service groups), the network latencies get long as well.

SUMMARY

In some embodiments of the disclosed method and apparatus, the use of traffic flag symbols allows a large number of CPEs to transmit traffic notifications to a network controller. In some such embodiments, hundreds of CPEs simultaneously transmit traffic flags on different subcarriers of a channel. For example, in a MoCA2 based access network, up to 480 CPEs can transmit flags in only 5 µs in the 100 MHz-wide channel.

BRIEF DESCRIPTION OF THE DRAWINGS

Various embodiments are described in detail with reference to the following figures. The drawings are provided for purposes of illustration only and merely depict typical or example embodiments. These drawings are provided to facilitate the reader's understanding and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that embodiments can be practiced with modification and alteration, and that the invention be limited only by the claims and the equivalents thereof.

DESCRIPTION

In some embodiments of the disclosed method and apparatus, the use of traffic flag symbols allows a large number of CPEs to transmit traffic notifications to a network controller. In some such embodiments, hundreds of CPEs simultaneously transmit traffic flags on different subcarriers of a channel. For example, in a MoCA2 based access network, up to 480 CPEs can transmit flags in only 5 µs in the 100 MHz-wide channel.

Figure 1:
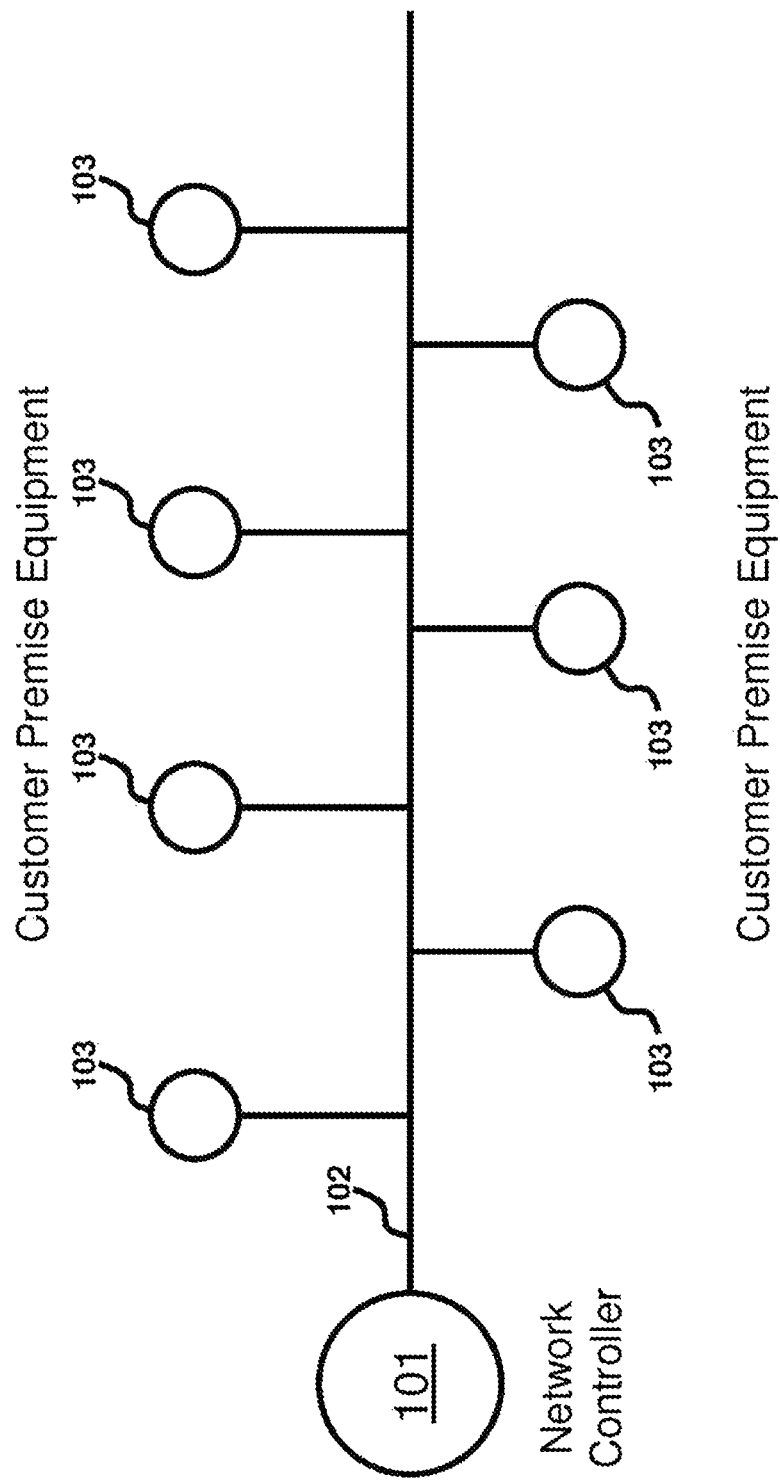
FIG. 1 illustrates an example of one environment in which some embodiments of the disclosed method and apparatus may be implemented.
Figure 2:
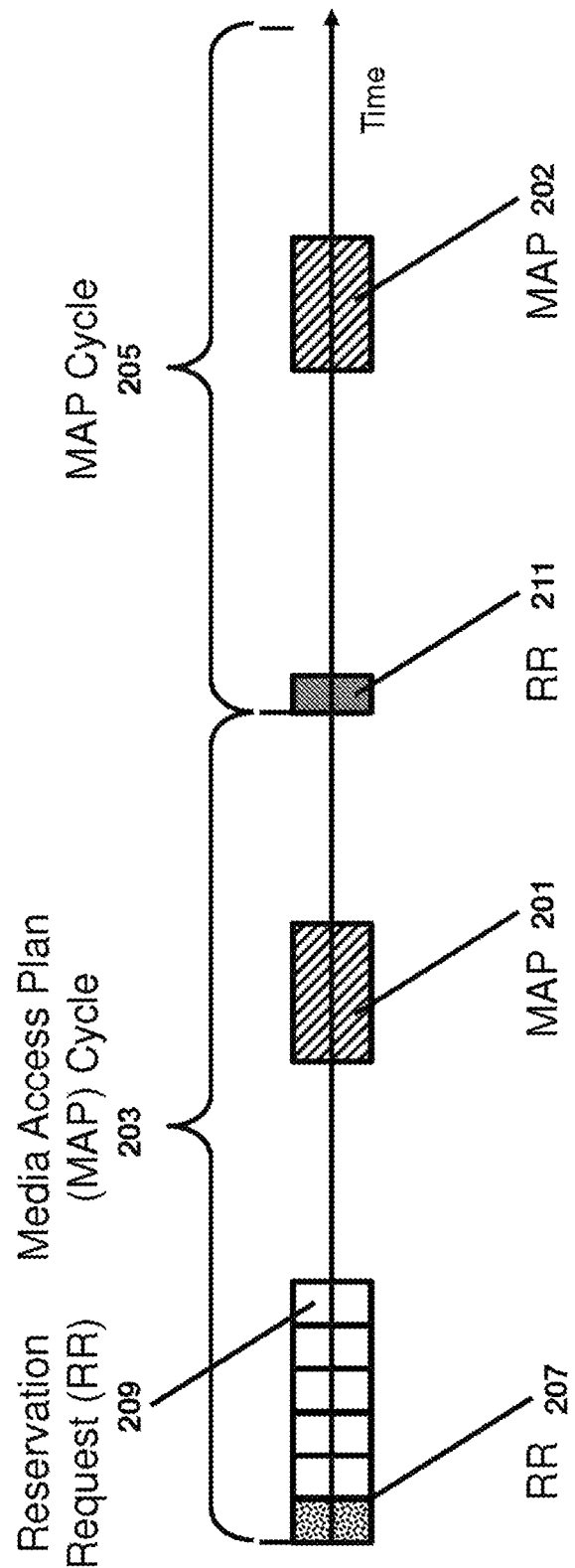
FIG. 2 is a timing diagram that illustrates the timing relationship between MAPs and MAP cycles according to certain embodiments of the methods and apparatus described herein.
Figure 3:
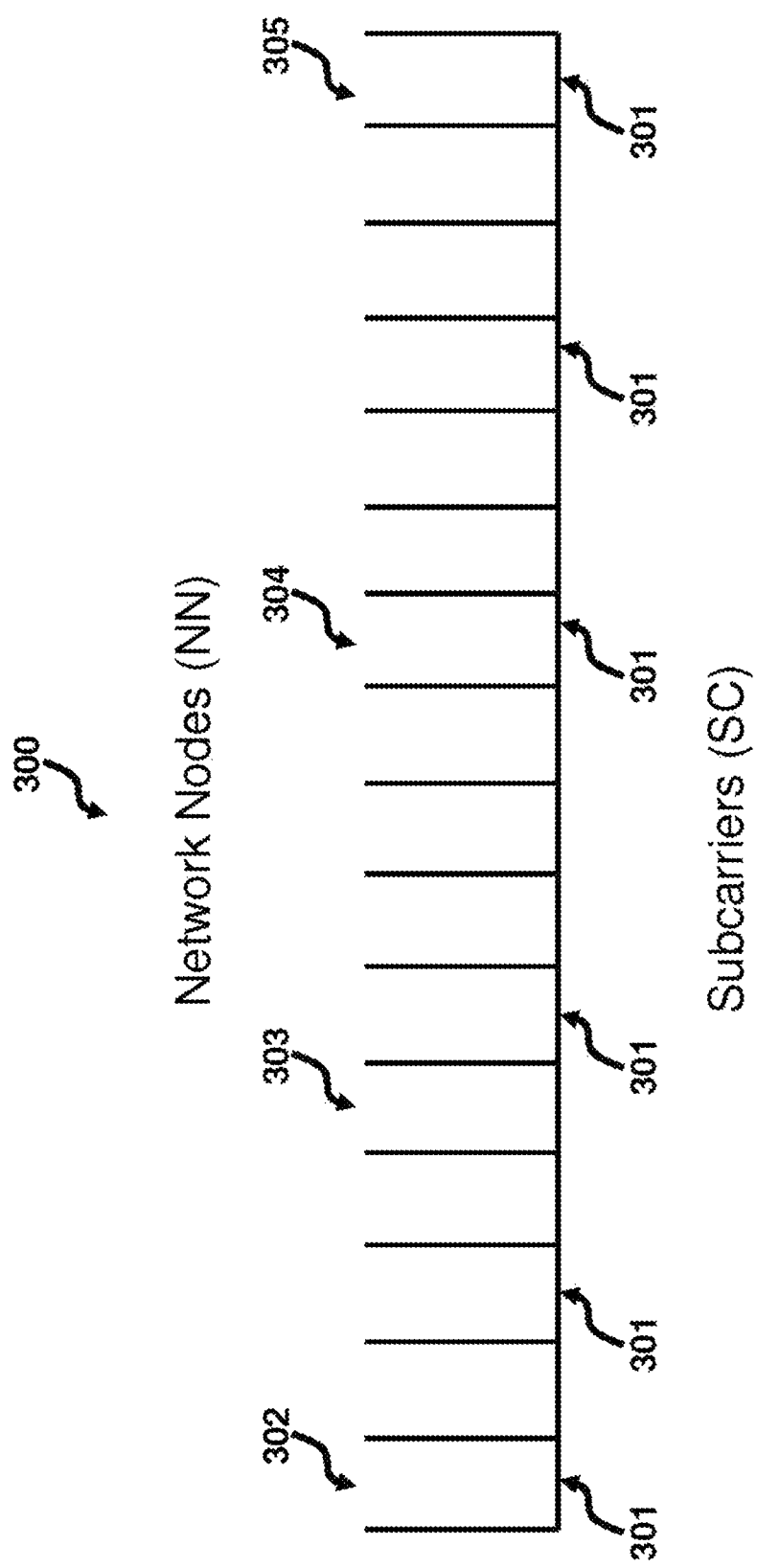
FIG. 3 illustrates a channel comprising a plurality of subcarriers for allocation of a traffic flag symbol.

In some such embodiments, each CPE is allocated a subcarrier of the channel for transmission of the CPE's traffic flags. The traffic flags are transmitted by the CPEs simultaneously, significantly reducing overhead. In some such embodiments, the fewer nodes there are in the network, the more subcarriers can be allocated to each node. For example, the number of subcarriers assigned to each network node may be $$\left\lfloor \frac{N_{sc}}{N_{NN}} \right\rfloor,$$

where $N_{SC}$ is the number of available subcarriers and $N_{NN}$ is the number of network nodes. FIG. 3 illustrates an example of such an assignment. In the example of FIG. 3, a channel 300 is divided into a plurality of subcarriers 301, which may be indexed 1 to N. A plurality of network nodes, for example, nodes 302, 303, 304, and 305 are assigned different subcarriers 301. In some embodiments, the assignment of subcarriers may be configured to spread the assignments throughout the channel 300. For example, this may occur when less than all available subcarriers 301 are assigned to nodes 302, 303, 304, 305. In some embodiments, multiple subcarriers 301 of the channel are assigned to each of the network nodes 302, 303, 304, 305 if the number of network nodes is below a threshold determined according to the number of subcarrier 301 of the channel.

In various embodiments, the time period for the transmission of the traffic flag symbol(s) may be scheduled by the NC and transmitted in the MAP. In other embodiments, the transmission of the traffic flag symbols may occur at a predetermined timeslot in the MAC cycle. If there are more information bits available for each CPE than there are subcarriers available for each CPE, then multiple traffic flag symbols could be transmitted to the NC in a MAP Cycle or allocation cycle. In one such embodiment, these traffic flag symbols could be sent in adjacent time slots.

For a 100 MHz channel-width channel using 480 subcarriers, as in MoCA2-based access, each of 480 CPEs may be allocated one subcarrier in a given symbol period. In networks having more than 480 CPEs, multiple traffic flag symbols may be employed. Networks having 240 or fewer CPEs may be allocated 2 subcarriers in a given symbol. However, it should be understood that it is not necessary to allocate the same number of subcarriers to all of the CPEs. Accordingly, one group of CPEs can be allocated one subcarrier while another smaller group could be allocated more than 2 subcarriers. Naturally, the total number of subcarriers for any one traffic flag symbol will be the total number of carriers that are used to transmit that traffic flag symbol.

For networks with fewer nodes, the Tx nominal power on fewer subcarriers provides more power per subcarrier and therefore a longer range for the traffic flag transmission. Since any one CPE is transmitting on a subset of the available subcarriers, then each transmitter can distribute its nominally available transmit power over that subset of subcarriers. Thus, each subcarrier can have higher amplitude than if the transmitter was transmitting all available subcarriers. Consequently, the traffics flag signals can be transmitted over channels that have significant path loss and which have relatively high accumulated transmitter noises and still arrive with high-enough signal to noise ratio (SNR) for the NC to detect the presence or absence of a subcarrier tone.

Different modulation schemes may be used in various embodiments. In some embodiments, BPSK (binary phase shift keying) up to 1024 QAM (quadrature amplitude modulation) may be used for the traffic flags, allowing each subcarrier to carry between 1 and 10 bits. In further embodiments, higher QAM schemes, such as 2048 or 4096 QAM may be employed. In other embodiments, on/off keying (OOK) modulation is used for the traffic flags. OOK may provide increased robustness, range, and receptivity. In embodiments that use OOK, and perhaps with other modulation schemes, preambles and forward error correction may not be needed. Instead, the entire transmission can be dedicated to transmitting payload data bits. Furthermore, OOK modulation does not require the NC receiver to discern between fine differences in phase (the NC only needs to determine the presence or absence of a tone on each subcarrier). Consequently, the traffic flag symbol can be transmitted without a preamble. Accordingly, using OOK reduces the overhead associated with sending these small packets even further.

In a system employing OOK, BPSK, or other 1 bit per subcarrier modulation schemes, the following table illustrates the number of bits of traffic flag information that can be transmitted per CPE in a single symbol period. The table assumes an access network based on MoCA 2 in which 480 subcarriers are available and the subcarriers are evenly assigned (i.e., the same number of subcarriers are used by each CPE):

| # CPEs Simultaneously Transmitting | # Bits Transmitted per CPE |
|---|---|
| 480 CPEs | 1-bit flag |
| 240 CPEs | 2-bit message |
| 160 CPEs | 3-bit message |
| 120 CPEs | 4-bit message |
| 96 CPEs | 5-bit message |
| 80 CPEs | 6-bit message |
| 60 CPEs | 8-bit message |
| 48 CPEs | 10-bit message |
| 40 CPEs | 12-bit message |

In some embodiments utilizing a one-bit message, the traffic flag is a single bit that indicates if the CPE has traffic to send upstream to the NC. For example, a 1 may indicate that there is traffic, while a 0 indicates that there is not traffic. If the bit indicates yes, then the NC schedules an RR as soon as possible. This single bit traffic flag allows up to 480 CPEs to send traffic flags in only 5 µs, averaging as little as ~11 ns channel time per CPE. In, embodiments where there are more subcarriers available for each CPE than there is information to transmit to the NC, then multiple subcarriers could be used to indicate a single traffic flag. That is, 2 or more subcarriers could be used to indicate a single bit of information. In this case, the NC could use a voting or other subjection (many-to-one) mapping to improve the reliability of the indication.

In embodiments in which each CPE is assigned more than one bit of the traffic flag symbol, the bits may be used to provide further information. For example, the bits could be encoded to indicate which of a CPE's set of particular service flows or logical link identifications (LLIDs) has data to transmit. Accordingly, the bits could be used as individual flags for each service flow or LLID. For example, a transmission of 010 might indicate that the CPE has traffic for its second flow, but not its first or third flows. In other embodiments, the additional bits might be used to indicate the amount of traffic to be scheduled. For example, the bits could be an indication of buffer fullness or to request the number of symbols to be scheduled. Even in embodiments utilizing multiple subcarriers, all CPEs are able to transmit their traffic flags in a single time slot, for example 5 µs.

As another example, nodes or CPEs often support different classifications of traffic for a variety of reasons such as different purposes, different services, different priorities, different QoS (Quality of Service), different encryptions, different SLAs (Service License Agreements), different VLANs (virtual local area networks). These different classifications may have different buffer queues associated with them. OSPs may provision CPEs to support a numerous variety of classifications identified by Service IDs, or Flow IDs, or LLIDs (such as used in EPON). CPEs could transmit Traffic Flags for each such classification, such as LLIDs.

As described above, large service groups are allocated traffic flags such that multiple nodes can transmit indications of upstream data simultaneously. This allows network groups as large as the number of subcarriers in a channel to simultaneously transmit their upstream data indications in as little a single symbol time. In further embodiment, the nodes can be allocated multiple symbols for further simultaneously transmitted messages. For example, in some networks, such as EPON, each CPE can be provisioned to support one or more LLIDs. In one such embodiment, the NC schedules traffic flags for each LLID from each CPE (e.g., 8 traffic flags from each CPE). If there were 480 CPEs on the access network, then the NC can schedule them all with 8 Traffic Flag symbols. If there were fewer CPEs on the access network (60, say), then each CPE can simultaneously transmit 8 traffic flags (8 subcarriers), and up to 60 CPEs could simultaneously send their 8 traffic flags (e.g., one per LLID), and all in only one symbol period. Each individual traffic flag could indicate if data was available to be scheduled from each LLID service (or buffer queue).

In other embodiments, the traffic flags are used to carry acknowledgment messages. For example, traffic flag symbols may be scheduled to carry upstream ACK or NACK flags from the CPEs to the NC, indicating whether previously-scheduled downstream traffic was correctly received or not received (respectively). An example of such downstream flow and upstream ACKs are the widely-used TCP sessions for downloads from internet-based TCP servers.

In the particular MoCA 2 environment, the OOK-OFDMA "preambleless" traffic flag symbols offer a throughput of up to ~87 Million bits per second (Mbps) (480 traffic flags÷5.5 μs=87 Mbps). For some circumstances, this throughput may be more favorable than conventional OFDMA packets. For example, traffic flag symbols may have advantages over OFDMA packets with short (e.g., single-symbol) payloads, a preamble and low-order bitloading. Preambleless traffic flag symbols at higher-order modulation than OOK offers an even more favorable tradeoff versus traditional OFDMA, which could offer higher throughput in more situations.

Figure 4:
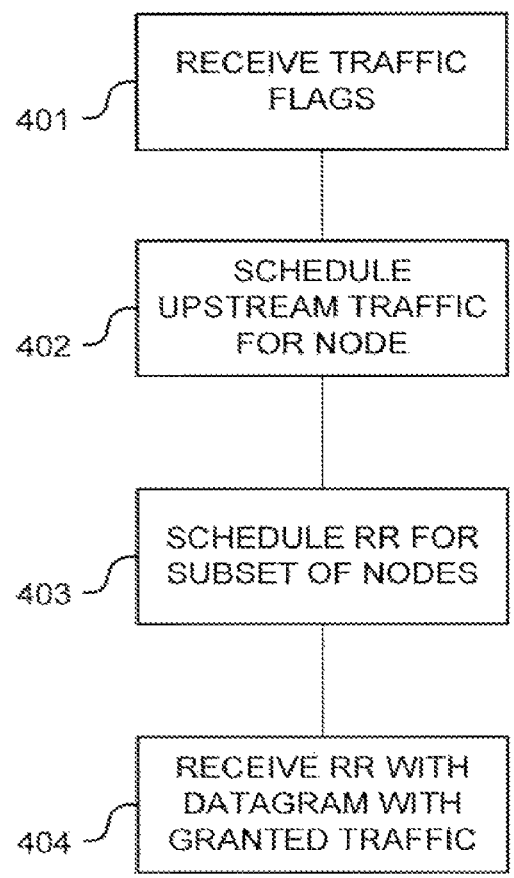
FIG. 4 illustrates a first method of coordinating network communications using traffic flags.

FIG. 4 illustrates a method of scheduling traffic in accordance with this disclosure. In step 401, an NC receives traffic flags transmitted simultaneously on a plurality of subcarriers from a plurality of network nodes. In the illustrated method, the flags indicate if the nodes have traffic to send to the NC. In step 402, the NC schedules an upstream traffic burst for the nodes that request such an upstream traffic burst by "setting" their flags. In step 403, which may be coincident with step 402, the NC schedules and grants RRs to a subset of the nodes in the MAP cycles, such as the nodes that are known or expected to have active flows in progress. However, the NC does not need to grant RRs to inactive nodes (such as nodes that did not indicate they have traffic to send in the Traffic Flag Symbol(s)). In step 404, the NC receives datagrams that were scheduled for upstream traffic bursts. In the illustrated embodiment, the node or CPE may include (for example by pre-pending or appending) an RR along with its data payload. This provides an efficient way to provide an RR to the NC when there is regular data traffic available from the CPE to carry the RR.

Figure 5:
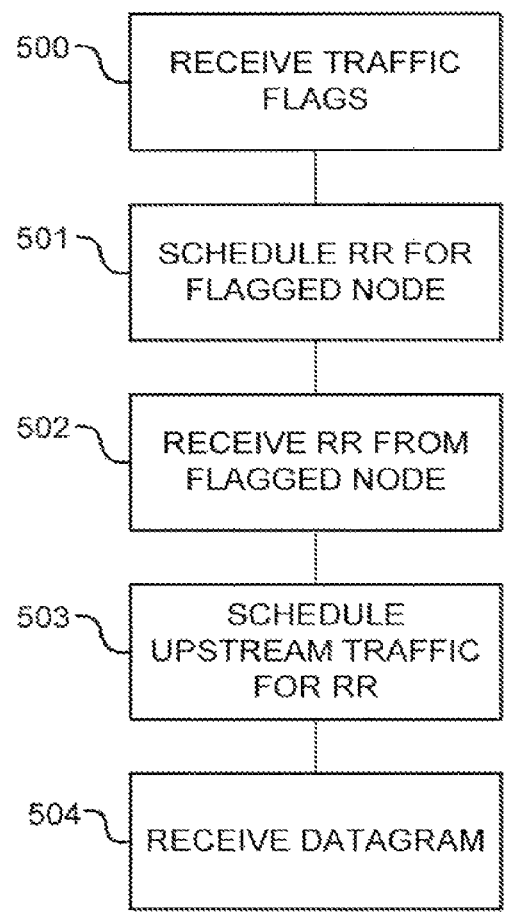
FIG. 5 illustrates a second method of coordinating network communications using traffic flags.
Figure 6:
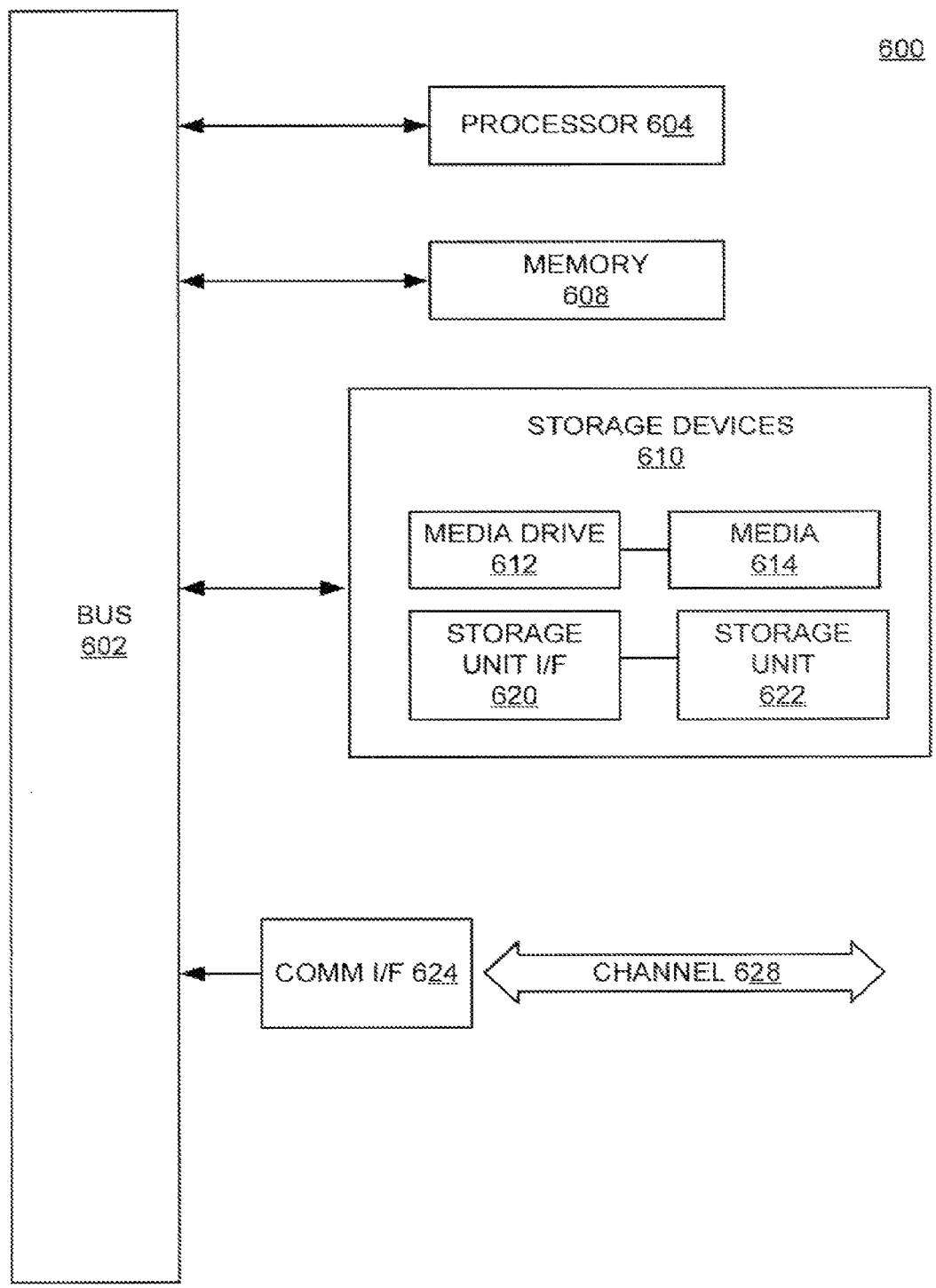
FIG. 6 illustrates an example computing module that may be used in implementing various features of embodiments.

FIG. 5 illustrates another method of traffic scheduling. In this method, the NC schedules and receives traffic flag symbols from the network nodes in step 500. For those nodes whose flag indicated that they have upstream data to transmit, the NC schedules RRs for those nodes in step 501. In step 502, the NC receives the RRs according to the schedule generated in step 501. In step 503, the NC performs standard network operations to schedule upstream traffic according to the RRs received in step 503. In step 504, the NC receives the scheduled upstream traffic from the nodes. Additionally, in this method, the NC may also schedule RRs for another subset of the nodes during the MAP cycles, such as the nodes that are known or expected to have active flows in progress.

Where components or modules are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement embodiments using other computing modules or architectures.

Referring now to FIG. 6, computing module 600 may represent, for example, computing or processing capabilities found within any other type of special-purpose or general-purpose computing devices. Computing module 600 might include, for example, one or more processors, controllers, control modules, or other processing devices, such as a processor 604. In the illustrated example, processor 604 is connected to a bus 602 to facilitate interaction with other components of computing module 600 or to communicate externally.

Computing module 600 might also include one or more memory modules, simply referred to herein as main memory 608, which may include random access memory (RAM) or other dynamic memory. Computing module 600 might likewise include a read only memory ("ROM") or other static storage device coupled to bus 602 for storing static information and instructions for processor 604. The computing module 600 might also include one or more various forms of information storage mechanism 610, which might include, for example, a media drive 612 and a storage unit interface 620.

Computing module 600) might also include a communications interface 624. Communications interface 624 might be used to allow software and data to be transferred between computing module 600 and external devices. Examples of communications interface 624 might include a modem or soft modem, a network interface, a communications port, or other communications interface It should be understood that the various features, aspects and functionality described in one or more of the individual embodiments are not limited in their applicability to the particular embodiment with which they are described. Rather, they can be applied, alone or in various combinations, to one or more of the other embodiments. This is true whether or not such embodiments are described and whether or not such features are presented as being a part of a described embodiment. Thus, the breadth and scope of the present invention should not be limited by any of the above-described exemplary embodiments, but rather should be determined solely by the scope of the claims appended hereto.

Additionally, the various embodiments set forth herein are described in terms of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for network communications, the method comprising:
   receiving an indication of a first assigned subcarrier, wherein a network controller assigns a different subcarrier to each of a first network node and a second network node; and
   transmitting a first traffic symbol on the first assigned subcarrier, the first traffic symbol comprising a traffic flag without forward error correction, the traffic flag indicating whether the first network node has upstream traffic to send to the network controller, the first traffic symbol being transmitted simultaneously with a second traffic symbol on a second assigned subcarrier, wherein the network controller schedules a reservation request based on the traffic flag.

2. The method of claim 1, comprising receiving a scheduled time for a reservation request in response to the traffic flag.

3. The method of claim 1, comprising receiving a scheduled time for uplink data in response to the traffic flag.

4. The method of claim 1, wherein the network controller schedules upstream traffic based on the traffic flag.

5. The method of claim 1, wherein the traffic flag comprises two or more bits.

6. The method of claim 1, wherein the traffic flag indicates a buffer fullness.

7. The method of claim 1, wherein the traffic flag indicates a number of symbols requested to be scheduled.

8. The method of claim 1, wherein the traffic flag comprises an acknowledgement of a receipt of a data packet.

9. The method of claim 1, wherein the network controller assigns multiple subcarriers to the first network node.

10. A network node, comprising:
    a processor; and
    a communications interface comprising:
        a receiver operable to receive an indication of a first assigned subcarrier from a network controller, wherein the network controller is operable to assign a different subcarrier to a different network node; and
        a transmitter operable to transmit a first traffic symbol on the first assigned subcarrier, the first traffic symbol comprising a traffic flag without forward error correction, the traffic flag indicating whether the network node has upstream traffic to send to the network controller, the first traffic symbol being transmitted simultaneously with a second traffic symbol on a second assigned subcarrier, wherein the network controller is operable to schedule a reservation request based on the traffic flag.

11. The network node of claim 10, wherein the receiver is operable to receive a scheduled time for a reservation request in response to the traffic flag.

12. The network node of claim 10, wherein the receiver is operable to receive a scheduled time for uplink data in response to the traffic flag.

13. The network node of claim 10, wherein the network controller is operable to schedule upstream traffic based on the traffic flag.

14. The network node of claim 10, wherein the traffic flag comprises two or more bits.

15. The network node of claim 10, wherein the traffic flag indicates a buffer fullness.

16. The network node of claim 10, wherein the traffic flag indicates a number of symbols requested to be scheduled.

17. The network node of claim 10, wherein the traffic flag comprises an acknowledgement of a receipt of a data packet.

18. The network node of claim 10, wherein the network controller is operable to assign multiple subcarriers to the first network node.

19. A method for network communications, the method comprising:
    receiving an indication of a first assigned subcarrier, wherein a network controller assigns a different subcarrier to each of a first network node and a second network node; and
    transmitting a first traffic symbol on the first assigned subcarrier, the first traffic symbol comprising a traffic flag without forward error correction, the traffic flag indicating whether the first network node has upstream traffic to send to the network controller, the first traffic symbol being transmitted simultaneously with a second traffic symbol on a second assigned subcarrier, wherein the traffic flag indicates a buffer fullness.

20. The method of claim 19, comprising receiving a scheduled time for a reservation request in response to the traffic flag.

21. The method of claim 19, comprising receiving a scheduled time for uplink data in response to the traffic flag.

22. The method of claim 19, wherein the network controller schedules a reservation request based on the traffic flag.

23. The method of claim 19, wherein the network controller schedules upstream traffic based on the traffic flag.

24. The method of claim 19, wherein the traffic flag comprises two or more bits.

25. The method of claim 19, wherein the traffic flag indicates a number of symbols requested to be scheduled.

26. The method of claim 19, wherein the traffic flag comprises an acknowledgement of a receipt of a data packet.

27. The method of claim 19, wherein the network controller assigns multiple subcarriers to the first network node.

28. A method for network communications, the method comprising:
    receiving an indication of a first assigned subcarrier, wherein a network controller assigns a different subcarrier to each of a first network node and a second network node; and
    transmitting a first traffic symbol on the first assigned subcarrier, the first traffic symbol comprising a traffic flag without forward error correction, the traffic flag indicating whether the first network node has upstream traffic to send to the network controller, the first traffic symbol being transmitted simultaneously with a second traffic symbol on a second assigned subcarrier, wherein the traffic flag indicates a number of symbols requested to be scheduled.

29. The method of claim 28, comprising receiving a scheduled time for a reservation request in response to the traffic flag.

30. The method of claim 28, comprising receiving a scheduled time for uplink data in response to the traffic flag.

31. The method of claim 28, wherein the network controller schedules a reservation request based on the traffic flag.

32. The method of claim 28, wherein the network controller schedules upstream traffic based on the traffic flag.

33. The method of claim 28, wherein the traffic flag comprises two or more bits.

34. The method of claim 28, wherein the traffic flag indicates a buffer fullness.

35. The method of claim 28, wherein the traffic flag comprises an acknowledgement of a receipt of a data packet.

36. The method of claim 28, wherein the network controller assigns multiple subcarriers to the first network node.

37. A network node, comprising:
a processor; and
a communications interface comprising:
- a receiver operable to receive an indication of a first assigned subcarrier from a network controller, wherein the network controller is operable to assign a different subcarrier to a different network node; and
- a transmitter operable to transmit a first traffic symbol on the first assigned subcarrier, the first traffic symbol comprising a traffic flag without forward error correction, the traffic flag indicating whether the network node has upstream traffic to send to the network controller, the first traffic symbol being transmitted simultaneously with a second traffic symbol on a second assigned subcarrier, wherein the traffic flag indicates a buffer fullness.

38. The network node of claim 37, wherein the receiver is operable to receive a scheduled time for a reservation request in response to the traffic flag.

39. The network node of claim 37, wherein the receiver is operable to receive a scheduled time for uplink data in response to the traffic flag.

40. The network node of claim 37, wherein the network controller is operable to schedule a reservation request based on the traffic flag.

41. The network node of claim 37, wherein the network controller is operable to schedule upstream traffic based on the traffic flag.

42. The network node of claim 37, wherein the traffic flag comprises two or more bits.

43. The network node of claim 37, wherein the traffic flag indicates a number of symbols requested to be scheduled.

44. The network node of claim 37, wherein the traffic flag comprises an acknowledgement of a receipt of a data packet.

45. The network node of claim 37, wherein the network controller is operable to assign multiple subcarriers to the first network node.

46. A network node, comprising:
a processor; and
a communications interface comprising:
- a receiver operable to receive an indication of a first assigned subcarrier from a network controller, wherein the network controller is operable to assign a different subcarrier to a different network node; and
- a transmitter operable to transmit a first traffic symbol on the first assigned subcarrier, the first traffic symbol comprising a traffic flag without forward error correction, the traffic flag indicating whether the network node has upstream traffic to send to the network controller, the first traffic symbol being transmitted simultaneously with a second traffic symbol on a second assigned subcarrier, wherein the traffic flag indicates a number of symbols requested to be scheduled.

47. The network node of claim 46, wherein the receiver is operable to receive a scheduled time for a reservation request in response to the traffic flag.

48. The network node of claim 46, wherein the receiver is operable to receive a scheduled time for uplink data in response to the traffic flag.

49. The network node of claim 46, wherein the network controller is operable to schedule a reservation request based on the traffic flag.

50. The network node of claim 46, wherein the network controller is operable to schedule upstream traffic based on the traffic flag.

51. The network node of claim 46, wherein the traffic flag comprises two or more bits.

52. The network node of claim 46, wherein the traffic flag indicates a buffer fullness.

53. The network node of claim 46, wherein the traffic flag comprises an acknowledgement of a receipt of a data packet.

54. The network node of claim 46, wherein the network controller is operable to assign multiple subcarriers to the first network node.

* * * * *